United States Patent
Yamamoto et al.

(10) Patent No.: US 6,439,240 B1
(45) Date of Patent: Aug. 27, 2002

(54) ASHTRAY PROVIDED WITH EXTINGUISHER

(75) Inventors: Hideo Yamamoto; Tokio Hayashi, both of Ogaki (JP)

(73) Assignee: Gifu Service Corporation, Ogaki (JP)

( * ) Notice: Subject to any disclaimer, the term of this patent is extended or adjusted under 35 U.S.C. 154(b) by 96 days.

(21) Appl. No.: 09/697,932

(22) Filed: Oct. 26, 2000

(30) Foreign Application Priority Data

Jul. 26, 2000 (JP) ........................................ 2000-225573

(51) Int. Cl.$^7$ ............................. A24F 13/18; B60N 3/12
(52) U.S. Cl. ..................... 131/237; 131/235.1; 131/231; 296/37.9
(58) Field of Search ............................ 131/237, 235.1, 131/231, 240.1, 242, 242.5; 296/37.9

(56) References Cited

U.S. PATENT DOCUMENTS 2,989,964 A * 6/1961 Willett ..................... 131/237
3,695,277 A * 10/1972 Moffa ........................ 131/237

FOREIGN PATENT DOCUMENTS

JP         55-32038      10/1981

* cited by examiner

Primary Examiner—James Derrington
Assistant Examiner—Dionne A. Walls
(74) Attorney, Agent, or Firm—Robert D. Buyan; Stout, Uxa, Buyan & Mullins, LLP

(57) ABSTRACT

An ashtray that can be used in a vehicle has an extinguishing function. The ashtray includes a case having an upper opening and a disposal chamber. A first lid is pivotally supported on one wall of the case and covers a first part of the upper opening. A second lid is pivotally supported on a second wall opposing the first wall and covers a second part of the opening. A slot is formed between the first and second lids. A rotor is rotatably supported by the case below the slot. The rotor has vanes, with adjacent vanes defining receptacles for holding lit cigarettes. One of the receptacles is arranged at a receiving position below the slot and another of the receptacles is arranged at an extinguishing position in which the receptacle is covered by the first lid. A rotating mechanism rotates the rotor such that the receptacle in the receiving position moves to the extinguishing position. A lit but finished cigarette is disposed of by putting it in the slot such that it falls into the receptacle at the receiving position. The rotor is then rotated, moving the receptacle with the cigarette to the extinguishing position. In the extinguishing position, the cigarette is extinguished due to a lack of oxygen, since in this position the receptacle is sealed shut. The next time the rotor is moved, the cigarette in the extinguishing chamber falls into the disposal chamber.

15 Claims, 4 Drawing Sheets

ASHTRAY PROVIDED WITH EXTINGUISHER

BACKGROUND OF THE INVENTION

The present invention relates to an ashtray, and more particularly, to an ashtray provided with an extinguisher.

In the prior art, when smoking while driving an automobile, a driver extinguishes a cigarette by pressing the cigarette against an ashtray, which is arranged in the automobile. The extinguishment of a cigarette may be dangerous since the driver must glance at the ashtray.

Accordingly, Japanese Unexamined Patent Publication No. 56-127083 describes a rotary ashtray that does not require the cigarette to be pressed against it in order to extinguish the cigarette. The rotary ashtray includes a case having a hollow portion, a cylindrical rotor that substantially contacts the wall of the hollow portion, a latchet mechanism for rotating the rotor about the axis thereof in angular intervals of 30°, and a pan attached to the lower surface of the case. Twelve grooves extend along the cylindrical surface of the rotor parallel to the rotor axis. The length and width of each groove are such that the groove can retain a cigarette. An upper slit and a lower slit are respectively provided on the upper surface and lower surface of the box. The length and width of the upper and lower slits are such that a cigarette can pass therethrough.

When using the ashtray, a cigarette is first dropped into the upper slit. The cigarette is then received by one of the grooves of the rotor. The latchet mechanism then rotates the rotor by 30°. This seals the groove holding the cigarette with the wall of the hollow portion. When the amount of oxygen in the groove is low, the cigarette is extinguished. When the rotor is rotated by 180°, the cigarette waste, such as tobacco ashes and the cigarette butt, falls from the groove and into the pan through the lower slit.

The extinguishment of the cigarette, however, may be insufficient since the cigarette is extinguished only in the groove.

SUMMARY OF THE INVENTION

It is an object of the present invention to provide an ashtray that guarantees the extinguishment of cigarettes.

To achieve the above object, the present invention provides an ashtray provided with an extinguishing function. The ashtray has a case including an upper opening and a disposal chamber for accommodating cigarette waste, a first lid pivotally supported by the case that covers a first part of the upper opening, and a second lid pivotally supported by the case that covers a second part of the upper opening. A slot having a predetermined width and length is defined between the first and second lids. A rotor is rotatably supported by the case. The rotor has a plurality of receptacles for temporarily retaining cigarettes. One of the receptacles is arranged at a receiving position below the slot. Another one of the receptacles is arranged at an extinguishing position at which the receptacle is covered by the first lid. A rotating mechanism rotates the rotor in predetermined angular intervals. A first extinguishment chamber is defined by the first lid and the receptacle arranged at the extinguishing position, and a second extinguishment chamber is defined by the first lid, the second lid, the rotor, and the case.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENT

Figure 1:
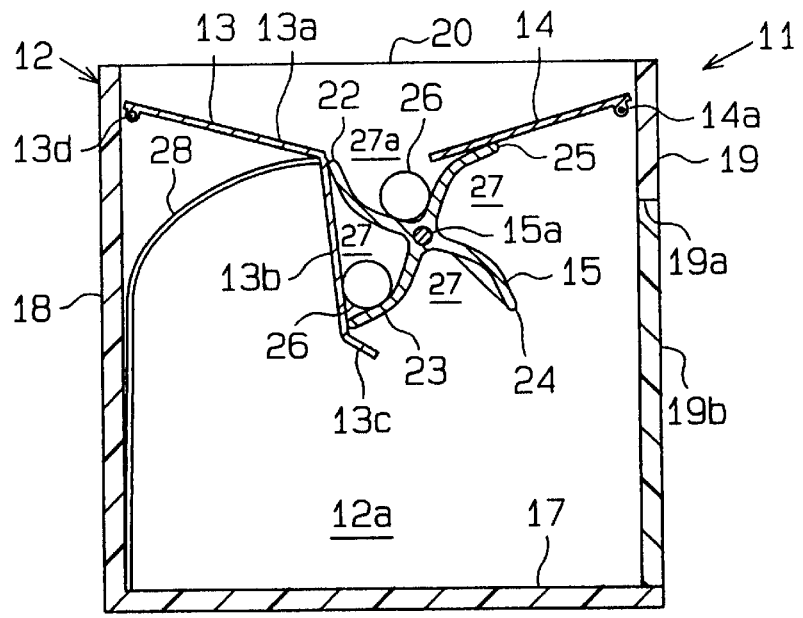
FIG. 1 is a cross-sectional view taken along line 1—1 in FIG. 2 and shows an ashtray according to a preferred embodiment of the present invention.

An ashtray 11 according to a preferred embodiment of the present invention will now be described.

As shown in FIGS. 1 to 7, the ashtray 11 includes a synthetic resin ashtray case 12 having an upper opening, front and rear lids 13, 14 arranged at the opening, a rotor 15, and a rotating mechanism 16 for rotating the rotor 15.

Figure 3:
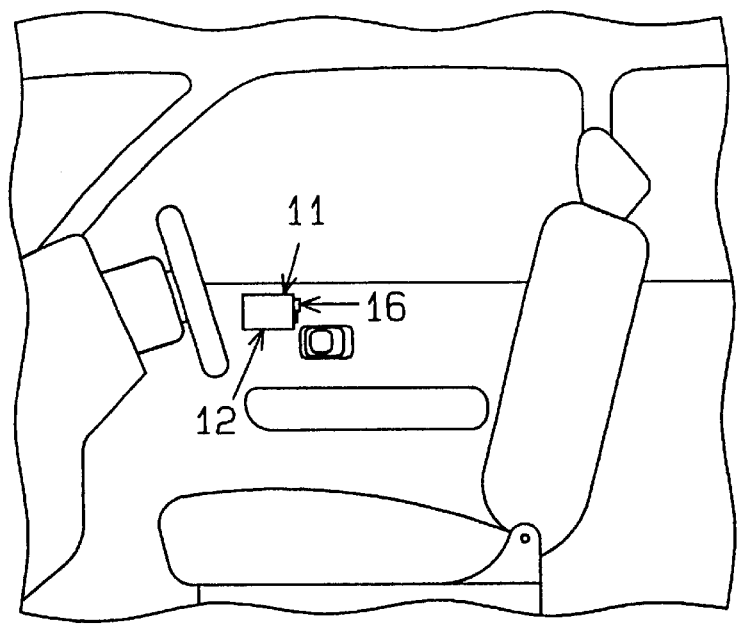
FIG. 3 is a side view showing an automobile incorporating the ashtray of FIG. 2.

The ashtray 11 is installed, for example, in a driver's side door of an automobile as shown in FIG. 3.

The ashtray case 12 has a bottom wall 17, a front wall 18, a rear wall 19, a left wall 20, and a right wall 21, which define a disposal chamber 12a. A disposal outlet 19a is formed in the rear wall 19. The disposal outlet 19a is covered by a cover 19b. Cigarette waste, such as ashes and cigarettes butts, are removed from the disposal chamber 12a by removing the cover 19b.

The rotor 15 has a rotor shaft 15a rotatably supported by the left and right walls 20, 21. First, second, third, and fourth vanes 22–25 extend radially from the rotor shaft 15a. Each of the vanes 22–25 is curved in the same direction (in the preferred embodiment, the clockwise direction as viewed in FIG. 1). A V-shaped receptacle 27 (27a) for temporarily holding a cigarette 26 is defined between each pair of adjacent vanes 22–25. The axial length of the rotor 15 is about the same as the distance between the left wall 20 and the right wall 21 and slightly longer than the full length of a cigarette.

The front lid 13 has a front lid shaft 13d pivotally supported between the left wall 20 and the right wall 21. A lid leaf spring 28, which serves as an urging member, biases the front lid 13 upward. The front lid 13 is a metal plate bent at two locations to define an upper piece (upper portion) 13a, which extends from the lid shaft 13d, a seal piece (intermediate portion) 13b, which extends from the upper piece 13a, and a support piece (lower portion) 13c, which extends from the seal piece 13b. The upper piece 13a extends diagonally downward from the front wall 18 into the middle of the opening of the ashtray case 12 so as to cover about half of the opening. The seal piece 13b extends toward the bottom wall 17.

The lid leaf spring 28 urges the seal piece 13b toward the rotor 15. As viewed in FIG. 1, the distal portions of the adjacent first and second vanes 22, 23 contact the upper and lower portions of the seal piece 13b. The support piece 13c contacts the second vane 23 and prevents the rotation of the rotor 15 in the counterclockwise direction. The seal piece 13b seals the corresponding V-shaped receptacle 27 shut. In other words, the seal piece 13b and the two vanes 22, 23 define a sealed V-shaped receptacle 27, or a first extinguishing chamber. A cigarette 26 is extinguished as the oxygen in the first extinguishing chamber becomes insufficient for it to stay lit.

The rear lid 14 has a rear lid shaft 14a pivotally supported between the left wall 20 and the right wall 21.

The rear lid 14 is a rectangular metal plate extending diagonally downward from the rear wall 19 to the middle of the opening of the ashtray case 12 so as to cover about half of the opening. A slot extends between the front and rear lids 13, 14. As viewed in FIG. 1, the fourth vane 25 supports the lower surface of the rear lid 14. Contact of the first and second vanes 22, 23 with the seal piece 13b and contact of the fourth vane 25 with the rear lid 14 seals shut the disposal chamber 12a. The disposal chamber 12a functions as a second extinguishing chamber.

The V-shaped receptacle 27a defined between the first vane 22 and the fourth vane 25 is located between the front and rear lids 13, 14. The receptacle 27a receives the cigarette 26 that is put into the slotted opening of the ashtray case 12.

Figure 2:
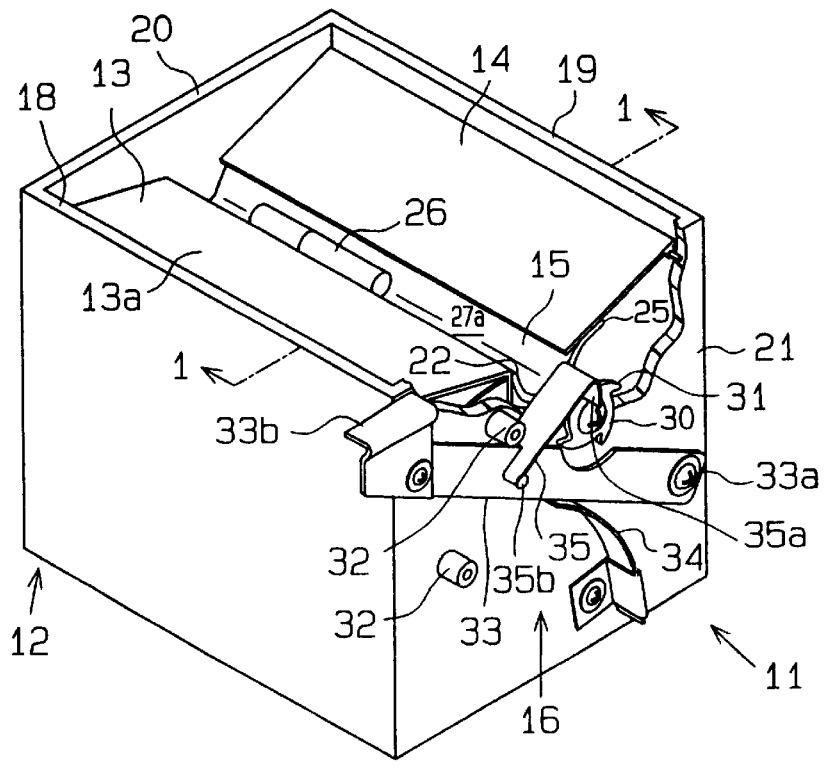
FIG. 2 is a perspective view showing the ashtray of the preferred embodiment.
Figure 4:
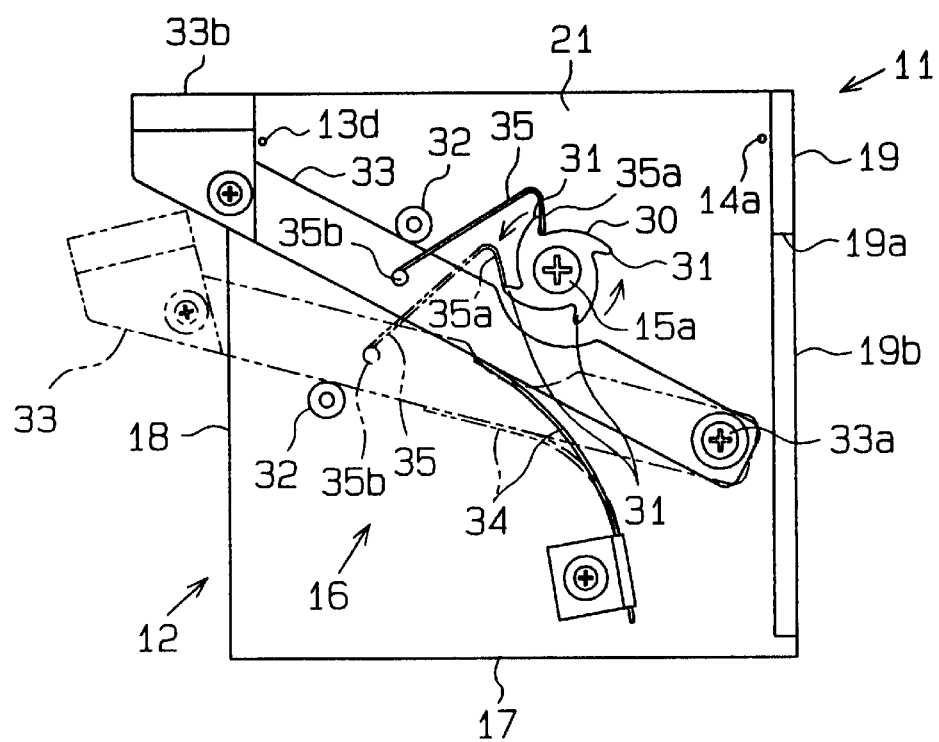
FIG. 4 is a side view showing a rotating mechanism of the ashtray of FIG. 2.
Figure 5:
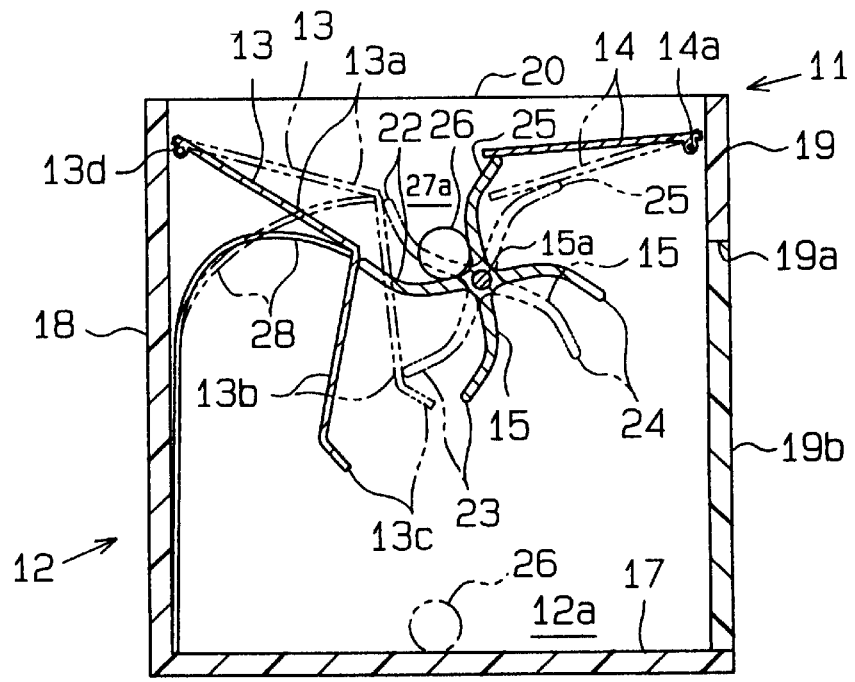
FIGS. 5 to 7 are cross-sectional views illustrating the operation of the ashtray.

As shown in FIGS. 2 and 4, the rotating mechanism 16 is arranged at the outer side of the right wall 21. A gear 30 fixed to the rotor shaft 15a rotates integrally with the rotor 15. The gear 30 has four equally arranged teeth 31.

An elongated lever 33 is supported pivotally about a pivot shaft 33a at the lower portion of the right wall 21 near the rear wall 19. A key 33b is provided on one end of the lever 33. A lever leaf spring 34 is arranged below the lever 33 to urge the lever 33 upward. Two stoppers 32 project from the right wall 21 near the front wall 18. The two stoppers 32 restrict the movement of the lever 33 between an upper position, which is shown by the solid lines in FIG. 4, and a lower position, which is shown by the broken lines.

An engaging member, or latch 35, which has a bent portion, is pivotally connected to a shaft 35b at the longitudinally middle portion of the lever 33. An engaging portion, or latching portion 35a for engaging the teeth 31 of the gear 30 is defined on the distal end of the latch 35.

When the lever 33 is arranged at the upper position, the latching portion 35a engages one of the teeth 31 of the gear 30. The lever 33 is moved to the lower position by pressing the key 33b against the force of the lever leaf spring 34. With reference to FIG. 4, when the lever 33 is moved to the lower position, the gear 30 and the rotor 15 are rotated by one pitch (90° in the counterclockwise direction). In other words, by pressing the lever 33, the V-shaped receptacles 27, 27a are moved by one pitch to the next position.

When the lever 33 is released, the lever leaf spring 34 moves the lever 33 upward. As the lever 33 moves, the latching portion 35 moves upward. The latching portion 35a then automatically engages the next tooth 31, which has been rotated by one pitch.

The method for using the ashtray 11 will now be described.

The rotor 15 is first located at an initial position shown in FIG. 1. At the initial position, the distal ends of the first and second vanes 22, 23 contact the seal piece 13b, and the fourth vane 25 contacts the lower surface of the rear lid 14. In this state, the V-shaped receptacle 27a between the first vane 22 and the fourth vane 25 is located below the slot between the lids 13, 14 and arranged at a receiving position.

When a lit cigarette 26 is dropped into the slotted opening of the ashtray case 12, the cigarette 26 is guided by the front and rear lids 13, 14 and falls through the slot into the V-shaped receptacle 27a. The cigarette 26 is held stably at the bottom of the V-shaped receptacle 27a.

The lever 33 is then pushed to the lower position. This rotates the gear 30 and the rotor 15 in the direction shown by the arrows in FIG. 4 from the initial position shown by broken lines in FIG. 5 to a first position shown by solid lines in FIG. 5. The rotation of the rotor 15 causes the first vane 22 to force the seal piece 13b toward the front wall 18. The curved form of the first vane 22 enables the distal portion of the first vane 22 to slide smoothly along the seal piece 13b. The second vane 23 simultaneously 23 moves away from the seal piece 13b, while the fourth vane 25 forces the rear lid 14 upward.

Figure 6:
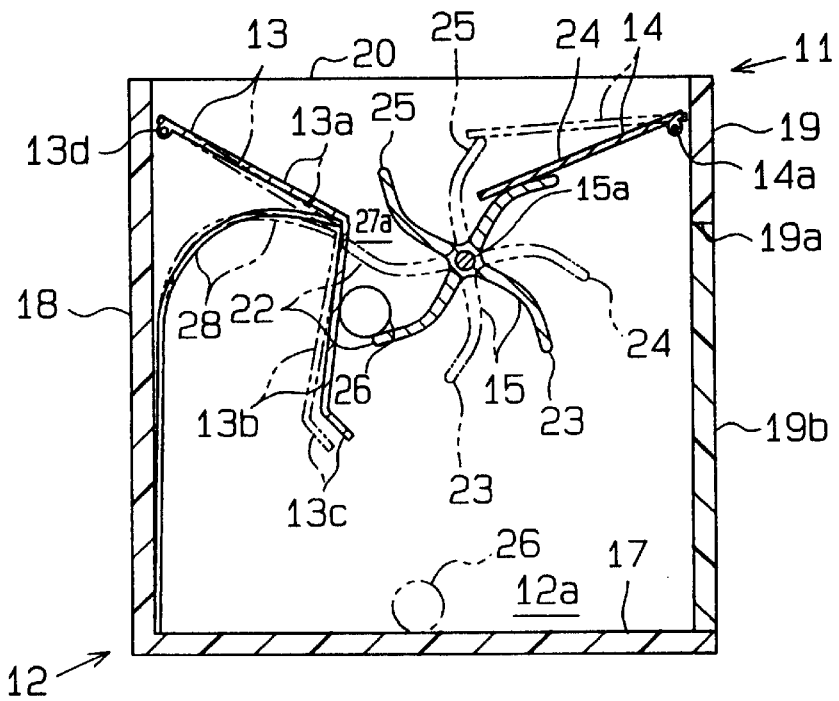
Figure 7:
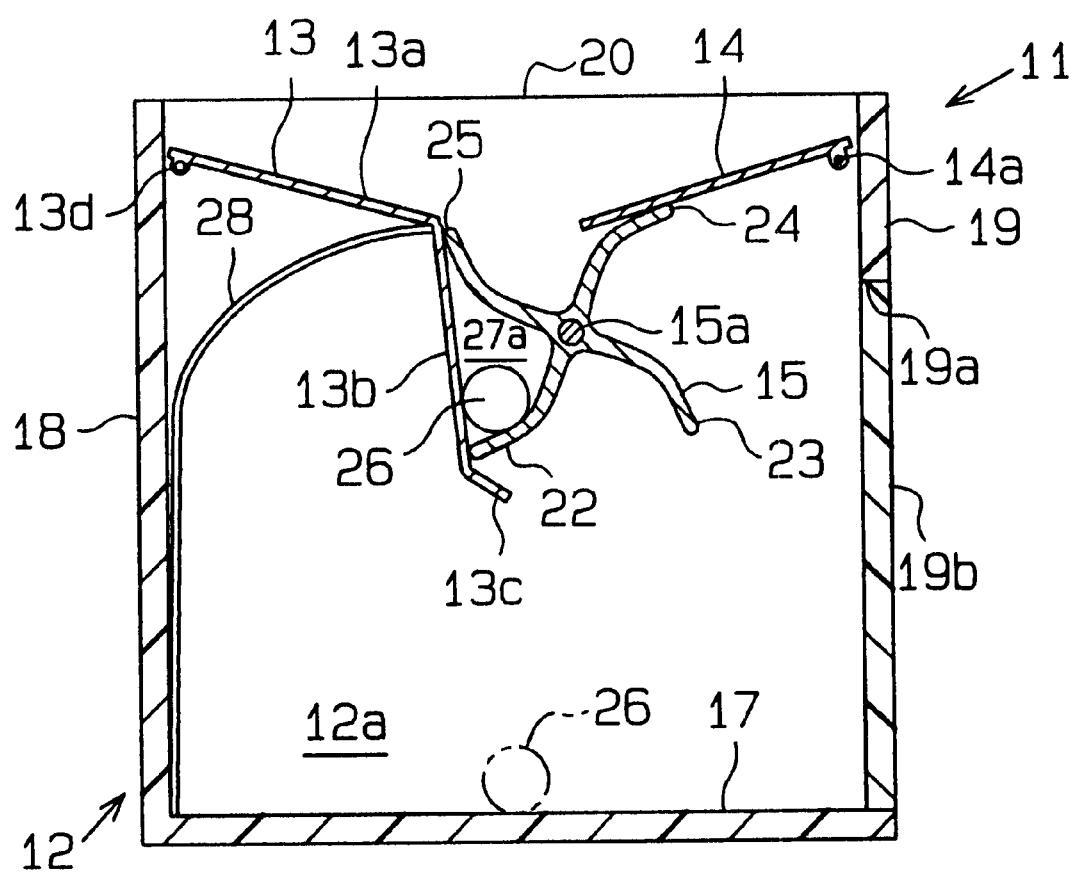

The rotor 15 then rotates from the first position shown by broken lines in FIG. 6 to a second position shown by solid lines. During the rotation, the rear lid 14 is pivoted downward by its own weight and then held by the third vane 24. The cigarette 26 is retained between the first vane 22 and the seal piece 13b.

When the lever 33 abuts against the lower stopper 32, the rotation of the gear 30 and the rotor 15 is stopped. This arranges the V-shaped receptacle 27a, which is holding the cigarette 26, at an extinguishing position shown in FIG. 7. When the V-shaped receptacle 27a is arranged at the extinguishing position, the first extinguishment chamber is sealed by the distal portions of the fourth and first vanes 25, 22 and the seal piece 13b. The cigarette 26 gradually consumes the oxygen in the first extinguishment chamber (V-shaped receptacle 27a ) until the cigarette 26 is extinguished. The support piece 13c supports the first vane 22 from below and restricts rotation of the rotor 15.

Further, the front lid 13 is returned to the initial position, and the rear lid 14 is supported by the third vane 24. In this state, the next V-shaped receptacle 27 between the fourth vane 25 and the third vane 24 is located at the receiving position.

By releasing the force applied to the lever 33, the lever 33 returns to the initial position and the latching portion 35a engages the next tooth 31.

When another cigarette 26 is dropped into the ashtray 11, the procedures described above are performed to rotate the rotor 15 and move the V-shaped receptacle 27a from the extinguishing position to a releasing position. At the releasing position, the first cigarette 26 falls into the disposal chamber 12a from the V-shaped receptacle 27a.

The disposal chamber 12a functions as a second extinguishment chamber that is sealed by the front and rear lids 13, 14, the rotor 15, and the walls 18–21. Accordingly, if the extinguishment of the cigarette 26 in the first extinguishment chamber is incomplete, the cigarette is extinguished as the amount of oxygen therein decreases.

The preferred embodiment has the advantages described below.

(1) The ashtray 11 seals the cigarette 26 in the first and second extinguishment chambers to extinguish the cigarette 26. Therefore, the cigarette 26 does not need to be pressed against the ashtray 11. Accordingly, the ashtray 11 enables safe driving. Further, the second extinguishment chamber guarantees extinguishment of the cigarette 26 even when the cigarette 26 is not extinguished in the first extinguishment chamber.

(2) The disposal chamber 12a is sealed to form the second extinguishment chamber. Accordingly, even when the ashtray 11 is used frequently and the cigarette 26 is held in the first extinguishment chamber for a short period of time, the extinguishment of the cigarette 26 in the disposal chamber 12a is guaranteed.

(3) The front lid 13 and the rotor 15 form the first extinguishment chamber, while the front lid 13, the rear lid 14, the rotor 15, and the walls 18–21 form the second extinguishment chamber. Thus, the structure of the ashtray 11 is more simple in comparison with the conventional rotary ashtray.

(4) The four V-shaped receptacles 27 are formed by the first to fourth vanes 22–25 of the rotor 15. Accordingly, a plurality of grooves do not have to be formed on the surface of a cylindrical rotor. This simplifies the manufacture of the rotor 15.

(5) The rotor 15 is provided with the four V-shaped receptacles 27 and rotated by about 90° each time the lever 33 is pressed. In other words, a cigarette 26 is transferred to the disposal chamber 12a by pressing the lever 33 twice. Accordingly, the ashtray 11 is operated a number of times less than the conventional rotary ashtray to release a cigarette 26 into the disposal chamber 12a from the rotor 15.

(6) The first to fourth vanes 22–25 are curved in the rotating direction of the rotor 15. Thus, when the rotor 15 is rotated, the first to fourth vanes 22–25 are not caught by the front and rear lids 13, 14. Accordingly, the rotor 15 rotates smoothly, and the extinguishment of a cigarette 26 in the first and second extinguishment chambers is guaranteed.

(7) The front lid 13 is urged toward the rotor 15 by the spring 28. This guarantees the sealing of the first extinguishment chamber with the seal piece 13b and the rotor 15. Further, gravitational force pivots the rear lid 14 downward and the lower surface of the rear lid 14 contacts the rotor 15. Accordingly, the sealing of the second extinguishment chamber 12a is assured.

(8) The front and rear lids 13, 14 are opposed to each other and extend diagonally downward toward the middle of the ashtray case 12 to guide a cigarette 26 into the V-shaped receptacle 27. This facilitates the extinguishment of the cigarette 26.

(9) The rotating mechanism 16 is mechanically operated through manual operation. Accordingly, the structure of ashtray 11 is simple in comparison to one that employs an electrical driving mechanism.

The preferred embodiment may be modified as described below.

A coil spring or an elastic body, which is made of rubber or the like, may be used in lieu of the lid leaf spring 28.

The upper piece 13a and the rear lid 14 may extend horizontally instead of extending diagonally.

Instead of using the curved vanes 22–25, linear vanes extending radially from the rotor shaft 15a may be employed. In this case, it is preferred that the distal portion of each vane be bent in the rotating direction of the rotor 15. Alternatively, vanes curved in a direction opposite the rotating direction of the rotor 15 may be employed.

The support piece 13c may be omitted.

The rotating mechanism 16 may be driven electrically. For example, an electric motor may be used to rotate the rotor 15.

A coil spring or an elastic body, which is made of rubber or the like, may be used in lieu of the lever leaf spring 34.

The number of V-shaped receptacles 27 of the rotor 15 may be changed. However, it is preferred that rotor 15 have at least three V-shaped receptacles 27. When three receptacles 27 are provided, the receptacles 27 are each arranged at one of a receiving position, an extinguishing position, and a releasing position. For example, if three V-shaped receptacles 27 are defined, three vanes are formed on the rotor 15.

The form of the ashtray case 12 may be changed to, for example, a triangular box or a circular box.

The ashtray 11 may be used in an automobile and installed in the instrument panel, passenger side door, or rear seat door. The ashtray 11 may also be installed in buses, taxis, or smoking areas inside buildings.

Water may be contained in the disposal chamber 12a. This further guarantees the extinguishment of cigarettes 26.

The cross-sectional form of the V-shaped receptacles 27 may be changed. For example, the receptacles may have curved bottom surfaces.

Instead of using a rotor provided with vanes, a cylindrical rotor may be used. In this case, it is preferred that equally spaced receptacles extending parallel to the axis of the rotor be formed in the cylindrical surface of the rotor to receive cigarettes 26. Each of the receptacles form the first extinguishment chamber when sealed by the seal piece 13b. The front and rear lids 13, 14, the rotor, and the walls 18–21 seal the disposal chamber 12a.

The cigarette 26 includes cigars. The ashtray 11 is preferable for disposing lit material, such as matches.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. An ashtray provided with an extinguishing function, comprising:

a case including an upper opening and a disposal chamber for accommodating cigarette waste;

a first lid pivotally supported by the case that covers a first part of the upper opening;

a second lid pivotally supported by the case that covers a second part of the upper opening, wherein a slot having a predetermined width and length is defined between the first and second lids;

a rotor rotatably supported by the case, wherein the rotor has a plurality of-receptacles for temporarily retaining cigarettes, one of the receptacles being arranged at a receiving position below the slot, and another one of the receptacles being arranged at an extinguishing position at which the receptacle is covered by the first lid; and a rotating mechanism for rotating the rotor in predetermined angular intervals, wherein a first extinguishment chamber is defined by the first lid and the receptacle arranged at the extinguishing position, and a second extinguishment chamber is defined by the first lid, the second lid, the rotor, and the case.

2. The ashtray according to claim 1, wherein the rotor includes at least three radially extending vanes, each of the receptacles being defined between two of the vanes that are adjacent to each other, wherein the two vanes defining the receptacle arranged at the extinguishing position contact the first lid.

3. The ashtray according to claim 2, wherein the vanes are curved in the rotating direction of the rotor.

4. The ashtray according to claim 2, wherein two of the vanes connect the first lid and the second lid.

5. The ashtray according to claim 1, wherein the rotating mechanism includes:
- a lever pivotally supported between an upper position and a lower position by the case;
- an urging element for urging the lever toward the upper position;
- an engaging member moved integrally with the lever between the upper position and the lower position, wherein the engaging member has a basal end pivotally connected to the lever and a distal end defining an engaging portion; and
- a gear rotated integrally with the rotor and having a plurality of teeth for engaging the engaging portion, wherein the engaging portion engaging one of the teeth rotates the gear and the rotor when the lever is moved to the lower position, and the engaging portion is disengaged from the one of the teeth to engage a further one of the teeth when the lever is returned to the upper position from the lower position by the urging element.

6. The ashtray according to claim 1, wherein the first and second lids are each arranged to form slopes extending from the top of the case to the slot.

7. The ashtray according to claim 1, further comprising a spring element for urging the first lid toward the rotor.

8. An ashtray provided with an extinguishing function, comprising:
- a case including an upper opening and a disposal chamber;
- a first lid pivotally supported by the case to cover a first part of the upper opening;
- a second lid pivotally supported by the case to cover a second part of the upper opening, wherein a slot having a predetermined width and length is defined between the first and second lids, the first lid having an upper portion, an intermediate portion, and a lower portion;
- a rotor rotatably supported in the case between the first and second lids, wherein the rotor includes a rotor shaft and at least three V-shaped receptacles extending parallel to the rotor shaft, a first one of the V-shaped receptacles being arranged at a receiving position located below the slot, a second one of the V-shaped receptacles being arranged adjacent to the receiving position at an extinguishing position at which the second receptacle is covered by the intermediate portion of the first lid, and a third one of the V-shaped receptacles being arranged adjacent to the extinguishing position at a releasing position;
- a rotating mechanism for sequentially rotating the rotor in predetermined angular intervals from the receiving position to the extinguishing position and then to the releasing position, wherein a first extinguishment chamber is defined by the intermediate portion of the first lid and the V-shaped receptacle arranged at the extinguishing position, and a second extinguishment chamber is defined by the first lid, the second lid, the rotor, and the case.

9. The ashtray according to claim 8, wherein the rotor includes at least three radially extending vanes, the V-shaped receptacles are defined by adjacent vanes, and two of the vanes contact the intermediate portion of the first lid when the associated V-shaped receptacle is arranged at the extinguishing position.

10. The ashtray according to claim 9, wherein the vanes are curved in the rotating direction of the rotor.

11. The ashtray according to claim 9, wherein two of the vanes connect the intermediate portion of the first lid with the second lid.

12. The ashtray according to claim 8, wherein the rotating mechanism includes:
- a lever supported pivotally between an upper position and a lower position by the case;
- a pair of stoppers for restricting the movement of the lever between the upper position and the lower position;
- a spring for urging the lever toward the upper position;
- an engaging member moved integrally with the lever between the upper position and the lower position, wherein the engaging member has a basal end pivotally connected to the lever and a distal end defining an engaging portion; and
- a gear rotated integrally with the rotor and having a plurality of teeth for engaging the engaging portion, wherein the engaging portion engaging one of the teeth rotates the gear and the rotor when the lever is moved to the lower position, and the engaging portion is disengaged from the one of the teeth to engage a further one of the teeth when the lever is returned to the upper position from the lower position by the spring.

13. The ashtray according to claim 8, wherein the first and second lids each have a basal end and a distal end, the basal ends of the first and second lids being pivotally connected to locations close to the top of the case, the distal ends of the first and second lids being located lower than the top of the case such that the upper portion of the first lid and the second lid each define sloped guide surfaces extending toward the slot.

14. The ashtray according to claim 8, further comprising a spring element for urging the intermediate portion toward the rotor.

15. The ashtray according to claim 8, wherein the case includes a disposal outlet for discharging cigarette waste from the disposal chamber and a removal cover for opening the disposal outlet.

* * * * *